United States Patent
Dragoljevic

(10) Patent No.: US 11,508,111 B1
(45) Date of Patent: Nov. 22, 2022

(54) AUGMENTED REALITY SHADER PROGRAMS

(71) Applicant: Meta Platforms Technologies, LLC, Menlo Park, CA (US)

(72) Inventor: Ognjen Dragoljevic, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/234,532

(22) Filed: Apr. 19, 2021

(51) Int. Cl.
*G06T 15/00* (2011.01)
*G06T 19/00* (2011.01)

(52) U.S. Cl.
CPC .......... *G06T 15/005* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2017/0032488 A1* | 2/2017 | Nystad | G06T 1/20 |
| 2019/0206110 A1* | 7/2019 | Gierach | G06T 15/005 |
| 2020/0074726 A1* | 3/2020 | Gierach | G06T 15/80 |
| 2020/0167999 A1* | 5/2020 | Schmit | G06F 3/013 |
| 2021/0065423 A1* | 3/2021 | Oldcorn | G06T 15/005 |

OTHER PUBLICATIONS

Michael D. McCool, Zheng Qin, Tiberiu S. Popa, "Shader Metaprogramming", 2002, Proceedings of Graphics Hardware 2002, pp. 57-68, Eurographics Association (Year: 2002).*

Tae-Young Kim, Jongho Kim, Hyunmin Hur, "A Unified Shader Based on the OpenGL ES 2.0 for 3D Mobile Game Development", 2007, Edutainment 2007: Technologies for E-Learning and Digital Entertainment, pp. 898-903 (Year: 2007).*

* cited by examiner

*Primary Examiner* — Michael J Cobb
(74) *Attorney, Agent, or Firm* — Baker Botts L.L.P.

(57) ABSTRACT

A computer-implemented method, including receiving, through an editor for designing augmented-reality effects, a plurality of shader programs each for an augmented-reality to be rendered for an augmented-reality effect; compiling each of the shader programs of augmented-reality object separately into corresponding shader modules; generate a merged shader module based on the shader modules; analyzing, according to one or more criteria, the merged shader module to identify fragment-shader instructions and vertex-shader instructions; splitting the merged shader module into a single fragment-shader module comprising the identified fragment-shader instructions and a single vertex-shader module comprising the identified vertex-shader instructions; and providing the single fragment-shader module and the single vertex-shader module to a graphics processing unit (GPU) to render the augmented-reality objects.

20 Claims, 3 Drawing Sheets

AUGMENTED REALITY SHADER PROGRAMS

TECHNICAL FIELD

This disclosure generally relates to an augmented reality shader program for rendering of augmented-reality objects.

BACKGROUND

Augmented reality provides a view of the real or physical world with added computer-generated sensory inputs (e.g., visual, audible). In other words, computer-generated or virtual effects augment or supplement the real-world view. For example, a mobile phone with a camera may capture a real-world scene and display a composite of the captured scene with computer-generated objects. The visual objects may be, for example, two-dimensional and/or three-dimensional objects.

The conventional process for designing an augmented reality effect may be time consuming and labor-intensive. An augmented reality design, at a high level, comprises artwork to be displayed (e.g., drawings or computer-rendered objects) and software instructions for controlling how the artwork would appear in the augmented-reality scene. The design process for an augmented-reality effect typically requires several iterations of designing and modifying the artwork and the software instructions in order to fine tune the desired effect. The process may be further complicated since the artist and programmer are usually different persons. Thus, a typical design flow may require, e.g., designing an artwork by an artist, integrating the artwork into an effect by a programmer, assessing the result, having the artist and/or the programmer refine the artwork and/or the software instructions, and repeating until the desired augmented-reality effect is achieved.

In operation, after an augmented-reality effect has been designed, objects appearing in the effect may be rendered by end-user devices (e.g., smart phone, tablet, laptop, desktop, etc.). The objects, which may be defined in three-dimensional space, may be processed or rendered one by one. Typically, the rendering order may be based on the objects' distance from the viewer or the display region. For example, if a scene on Mars includes a red filter, smoke, and an astronaut placed in that order in three-dimensional space from the viewer, the three objects may be rendered in that same sequence (e.g., closer objects may be rendered first). Augmented-reality effects may be displayed through a variety of devices. For example, augmented-reality effects may be displayed on a user's mobile phone, tablet, laptop, computer monitor, television, or any other display devices. However, different display devices may have different aspect ratios, resolution, display orientations, and/or other display features. Even if an augmented-reality effect is displayed as desired on one device in a particular viewing mode, it may not display as desired on a different device or in a different viewing mode.

SUMMARY OF PARTICULAR EMBODIMENTS

Innovative aspects of the subject matter described in this specification may be embodied in a method including receiving, through an editor for designing augmented-reality effects, a plurality of shader programs each for an augmented-reality object to be rendered for an augmented-reality effect; compiling each of the shader programs of the augmented-reality object separately into corresponding shader modules; generate a merged shader module based on the shader modules; analyzing, according to one or more criteria, the merged shader module to identify fragment-shader instructions and vertex-shader instructions; splitting the merged shader module into a single fragment-shader module comprising the identified fragment-shader instructions and a single vertex-shader module comprising the identified vertex-shader instructions; and providing the single fragment-shader module and the single vertex-shader module to a graphics processing unit (GPU) to render the augmented-reality objects.

Other embodiments of these aspects include corresponding systems, apparatus, and computer-readable mediums.

These and other embodiments may each optionally include one or more of the following features. For instance, compiling each of the shader programs further comprises compiling each of the shader programs separately into corresponding unlinked shader modules. Each of the unlinked shader modules includes unlinked bytecode. Generating the merged shader module further comprises linking each of the unlinked shader modules to form the merged shader module. The merged shader module is a linked shader module. Analyzing the merged shader module further includes identifying a parameter of each of the shader modules that indicates the fragment-shader instructions of the respective shader module. Analyzing the merged shader module further includes identifying instructions of each of the shader modules that are nested within fragment-shader instructions of the respective shader module. Analyzing the merged shader module further includes identifying instructions of each of the shader modules that are dependent from fragment-shader instructions of the respective shader module.

DESCRIPTION OF EXAMPLE EMBODIMENTS

The present disclosure discusses an augmented reality shader program for rendering of augmented-reality objects. Specifically, an augmented-reality (AR) platform can include a creator facing application and an AR engine for rendering of AR experiences. A creator can interact with the creator facing application for authoring multiple AR experiences/effects, and the AR Engine can render such AR experiences in various applications. Each AR effect/object can include multiple shader instruction sets that includes both vertex shader instructions and fragment shader instructions. For each AR effect/object, the AR engine can combine the multiple shader instruction sets together for the AR effect/object, and then split the combined instruction sets into a single vertex shader module and a single fragment shader module. The single vertex shader module and the single fragment shader module is what is typically expected by a graphics processing unit (GPU). Specifically, the AR engine can merge the multiple shader instruction sets of the AR object to form a merged shader module. The AR engine can then split the merged shader module to form a single vertex shader module and a single fragment shader module.

Figure 1:
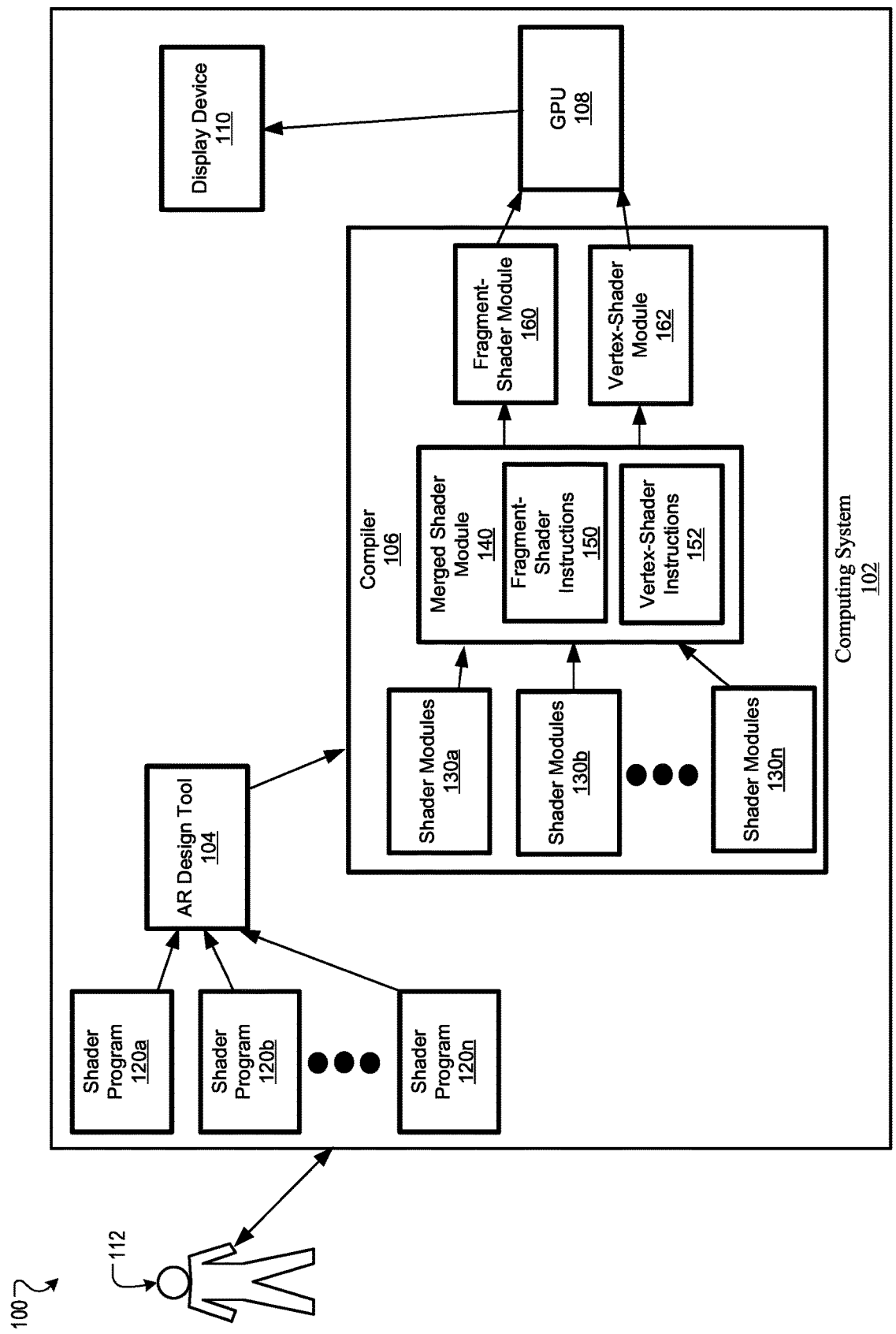
FIG. 1 illustrates an example system for an augmented reality shader program for rendering of augmented-reality objects.

FIG. 1 illustrates a computing environment 100 including a computing system 102. The computing system 102 can include an augmented-reality (AR) design tool computing module 104, a compiler 106, a graphics processing unit (GPU) 108, and a display device 110. The AR design tool 104 can be in communication with the compiler 106. The compiler 106 can be in communication with the GPU 108. The GPU 108 can be in communication with the display device 110.

A user 112 can interact with, or engage with, the information handling system 102, and in particular, the AR design tool 104. The AR design tool 104 can include a creator-facing computing application for authoring multiple AR experiences/effects that are to be rendered in various applications (and for display by the display device 110).

The AR design tool 104 can receive shader programs 120a, 120b, . . . , 120n (collectively referred to as shader programs 120), or shader instruction sets 120. Each of the shader programs 120 can be associated with an AR object that is to be rendered for an AR effect (e.g., rendered for display by the display device 110). In some cases, each shader program 120 can include vertex shader instructions, fragment shader instructions, or both. For example, each shader program 120 can include computer-readable programming instructions that specifies both vertex shader instructions and fragment shader instructions.

The compiler 106 can compile each of the shader programs 120a, 120b, . . . , 120n of the AR object separately into corresponding shader modules 130a, 130b, . . . , 130n, respectively (collectively referred to as shader modules 130). In some examples, each of the shader modules 130 are unlinked shader modules. In some examples, each of the shader modules 130 includes unlinked bytecode. Specifically, the complier 106 can compile each of the shader programs 120 into respective unlinked bytecode. In some examples, the AR design tool 104 can provide additional shader modules to the compiler 106.

The compiler 106 can generate a merged shader module 140 based on the shader modules 130. Specifically, the compiler 106 can merge shading instruction sets of the shader modules 120 to form the merged shader module 140 (or merged shader instruction set 140). That is, the compiler 106 can combine the shader instruction sets associated with each of the shader modules 130 together. In some examples, the compiler 106 can combine the shader modules 130 with "built-in" modules of the compiler 106 that are contained in an application binary.

In some examples, the compiler 106 can generate the merged shader module 140 by linking each of the unlinked shader modules 130 to form the merged shader module 140. Thus, the compiler 106 can generate the merged shader module 140 as a linked shader module by linking each of the unlinked shader modules 130.

In some examples, the compiler 106 can apply inline functions to the merged shader module 140 to form an inline shader module. Specifically, functions of the merged shader module 140 that receive or return another function are to be in-lined (prior to splitting).

The compiler 106 can analyze, according to one or more criteria, the merged shader module 140 to identify fragment shader instructions 150 and vertex shader instructions 152. The compiler 106 can split the merged shader module 140 into a single fragment-shader module 160 including the fragment-shader instructions 150; and a single vertex-shader module 162 including the vertex-shader instructions 152.

The single fragment shader module 160 and the single vertex-shader module 162 is what is expected by the GPU 108.

In some examples, the compiler 106 can analyze the merged shader module 140 by identifying a parameter of each of the shader modules 130 that indicates the fragment-shader instructions of the respective shader module 130. Specifically, the criteria can indicate that instructions of the merged shader module 140 default (or preferred) stage is a vertex-shader instruction. Furthermore, one or more instructions of the shader modules 130 can indicate that the instruction is a fragment-shader instruction. As a result, when the compiler analyzes the merged shader module 140, instructions that are associated with the parameter are identified as fragment-shader instructions, and are included by the single fragment shader module 160.

In some examples, the compiler 106 can analyze the merged shader module 140 by identifying instructions of each of the shader modules 130 that are nested within fragment-shader instructions of the respective shader module 130. Specifically, during analysis, the compiler 106 can identify instructions that are nested—child instruction dependent upon parent instruction. When the parent instruction is a fragment-shader instruction, all child instructions of the parent instruction are as well fragment-shader instructions. Furthermore, if the child instruction is indicated by the parameter as a fragment-shader instruction, the compiler 106 will identify the child instruction as a fragment-shader instruction. However, when the parent instruction is a vertex-shader instruction, the compiler 106 can maintain the desired stage as indicated by the parameter of the child instruction or the default.

In some examples, the compiler 106 can analyze the merged shader module 140 by identifying instructions of each of the shader modules 130 that are dependent from fragment-shader instructions of the respective shader module 130. Specifically, during analysis, the compiler 106 can identify instructions that are dependent upon other instructions. When the other instructions are fragment-shader instructions, all dependent instructions of the other instruction are as well fragment-shader instructions.

The compiler 106 can provide the single fragment shader module 160 and the single vertex shader module 162 to the CPU 108 to render the AR objects. The GPU 108 can render the AR objects based on the fragment shader module 160 and the vertex-shader module 162 at the display device 110.

In a use-case example, consider the two separate shader modules (e.g., shader modules 130):

// Texture.sparksl
uniform sampler2D u_MyTexture;
uniform mat2 u_MyTransform;
export vec4 awesomeTexture(vec2 uv) {
　　return　　texture2D(u_MyTexture,　　fragment
　　　(u_MyTransform*uv));
}

The Texture.sparksl module exports the "vec4 awesomeTexture(vec2 uv)" function which internally uses "u_MyTexture" and "u_MyTransform" uniforms and computes the result based on a computation on them. The "u_MyTransform*uv)" portion is to be executed as a vertex shader instruction 152, whereas "texture2D (u_MyTexture, . . . )" portion is to be executed as a fragment shader instruction 152.

// Material.sparksl
import function<vec4(vec2)> awesomeTexture;
attribute vec2 a_TexCoords;
attribute vec4 a_Position;

```
void main( ) {
   gl_Position=a_Position;
   gl_FragColor=awesomeTexture(1.0-a_TexCoords)
      *1.5;
}
```

The Material.sparksl module imports "awesomeTexture," function without knowledge of internal details thereof, and uses it to compute the final color. The "(1.0-a_TexCoords)" portion is to be executed as a vertex shader instruction 152, whereas "gl_FragColor= . . . *1.5" portion is to be executed as a fragment shader instruction 152.

The compiler 106 can take these two modules, combines them together as the merged shader module 140, and produce the fragment shader module 160 and the vertex-shader module 162 which is what is expected by the GPU 108. The resulting programs are as follows:

```
// Vertex Shader
attribute vec2 a_TexCoords;
attribute vec4 a_Position;
uniform mat2 u_MyTransform;
varying vec2 v_var;
void main( ) {
   gl_Position=a_Position;
   v_var=(u_MyTransform*(1.0-a_TexCoords));
}
```

Note that the vertex portion of Texture.sparksl "(u_MyTransform* . . . )" as well as the vertex part of Material.sparksl "(1.0-a_TexCoords)" both are included by vertex-shader module 162.

```
// Fragment Shader
uniform sampler2D u_MyTexture;
varying vec2 v_var;
void main( ) {
   gl_FragColor=(texture2D(u_MyTexture, v_var)*1.5);
}
```

Note that the fragment portion of Texture.sparksl "texture2D(u_MyTexture, . . . )" as well as the fragment portion of Material.sparksl "gl_FragColor= . . . *1.5" are included by the fragment shader module 160.

This allows for vertex portions of each shader module 130 to be optimally placed in the vertex-shader module 162 as well as for fragment portions of each shader module 130 to be placed in the fragment-shader module 160 without any of the modules requiring any knowledge about how the other modules are structured with respect to vertex/fragment separation or any other internal detail of them.

Figure 2:
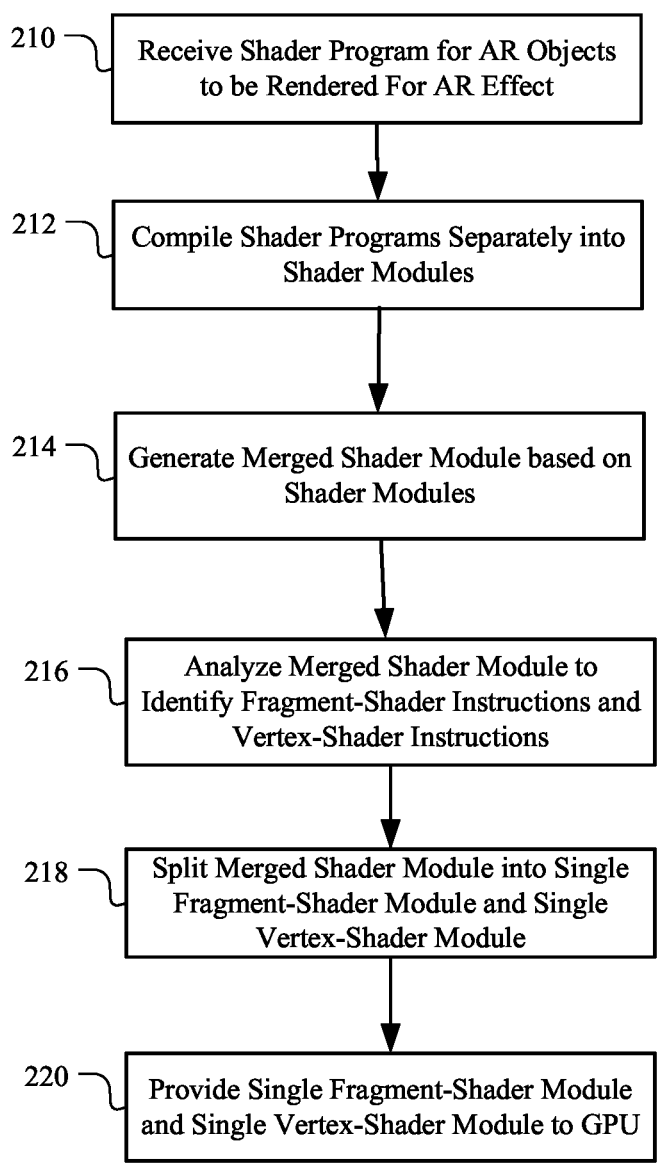
FIG. 2 illustrates an example method for rendering augmented-reality objects.

FIG. 2 illustrates an example method 200 for implementing an augmented reality shader program for rendering of augment-reality objects. In particular embodiments, the method may begin at step 210, the AR tool 104 can receive the shader programs 120 for the AR object to rendered for an AR effect. At step 212, the compiler 106 compiles each of the shader programs 120 separately into corresponding shader modules 130. At step 214, the compiler 106 generates the merged shader module 140. At step 216, the compiler 106 analyzes, according to one or more criteria, the merged shader module 140 to identify fragment shader instructions 150 and vertex shader instructions 152. At step 218, the compiler 106 splits the merged shader module 140 into the single fragment shader module 160 including the fragment shader instructions 150 and the vertex shader module 162 including the vertex shader instructions 152. At step 220, the compiler 106 can provide the single fragment shader module 160 and the single vertex shader module 162 to the GPU 108 to render the AR objects.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for controlling how objects are rendered using an augmented-reality design editor, including the particular steps of the method of FIG. 2, this disclosure contemplates any suitable method for controlling how objects are rendered using an augmented-reality design editor, including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
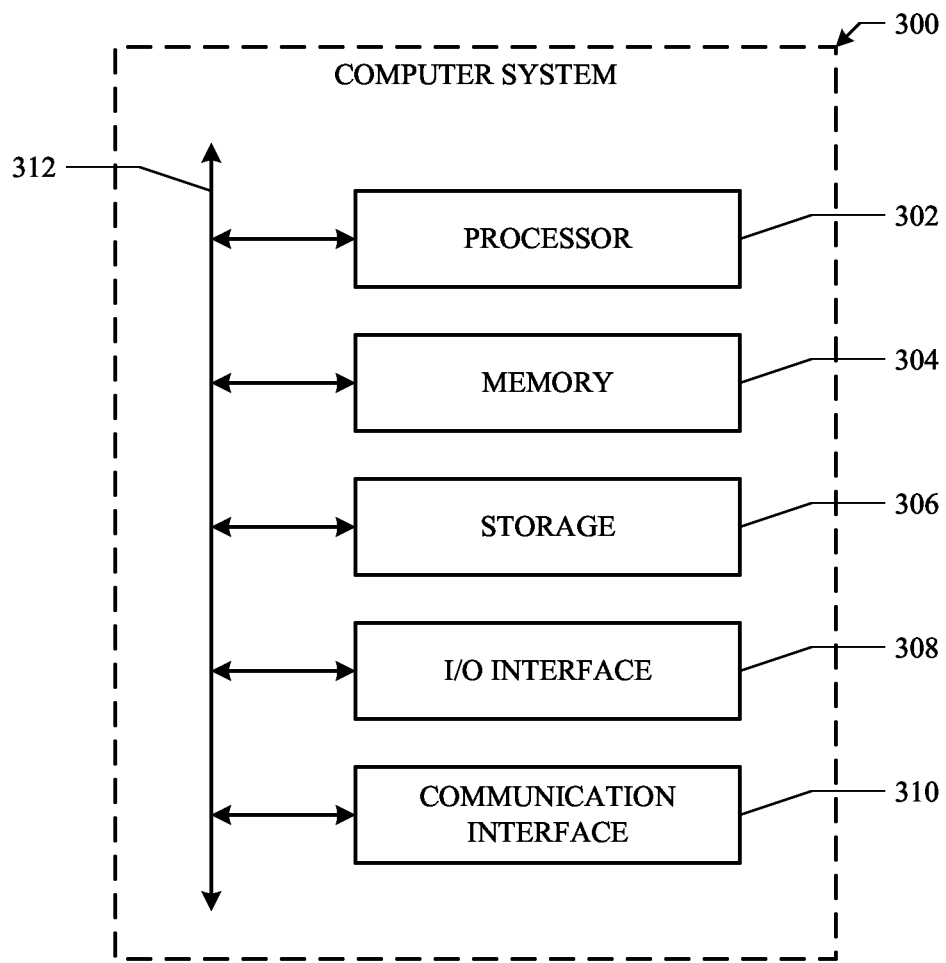
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising:
   receiving, through an editor for designing augmented-reality effects, a plurality of shader programs each for an augmented-reality object to be rendered for an augmented-reality effect;
   compiling each of the shader programs of the augmented-reality object separately into corresponding shader modules;
   generating a merged shader module based on the shader modules;
   analyzing, according to one or more criteria, the merged shader module to identify fragment-shader instructions and vertex-shader instructions;
   splitting the merged shader module into a single fragment-shader module comprising the identified fragment-shader instructions and a single vertex-shader module comprising the identified vertex-shader instructions; and
   providing the single fragment-shader module and the single vertex-shader module to a graphics processing unit (GPU) to render the augmented-reality objects.

2. The computer-implemented method of claim 1, wherein compiling each of the shader programs further comprises compiling each of the shader programs separately into corresponding unlinked shader modules.

3. The computer-implemented method of claim 2, wherein each of the unlinked shader modules includes unlinked bytecode.

4. The computer-implemented method of claim 2, wherein generating the merged shader module further comprises linking each of the unlinked shader modules to form the merged shader module.

5. The computer-implemented method of claim 4, wherein the merged shader module is a linked shader module.

6. The computer-implemented method of claim 1, wherein analyzing the merged shader module further includes identifying a parameter of each of the shader modules that indicates the fragment-shader instructions of the respective shader module.

7. The computer-implemented method of claim 1, wherein analyzing the merged shader module further includes identifying instructions of each of the shader modules that are nested within fragment-shader instructions of the respective shader module.

8. The computer-implemented method of claim 1, wherein analyzing the merged shader module further includes identifying instructions of each of the shader modules that are dependent from fragment-shader instructions of the respective shader module.

9. One or more computer-readable non-transitory storage media embodying software that is operable when executed to:

receive, through an editor for designing augmented-reality effects, a plurality of shader programs each for an augmented-reality object to be rendered for an augmented-reality effect;

compile each of the shader programs of the augmented-reality object separately into corresponding shader modules;

generate a merged shader module based on the shader modules;

analyze, according to one or more criteria, the merged shader module to identify fragment-shader instructions and vertex-shader instructions;

split the merged shader module into a single fragment-shader module comprising the identified fragment-shader instructions and a single vertex-shader module comprising the identified vertex-shader instructions; and provide the single fragment-shader module and the single vertex-shader module to a graphics processing unit (GPU) to render the augmented-reality objects.

10. The computer-readable non-transitory storage media of claim 9, wherein compiling each of the shader programs further comprises compiling each of the shader programs separately into corresponding unlinked shader modules.

11. The computer-readable non-transitory storage media of claim 10, wherein each of the unlinked shader modules includes unlinked bytecode.

12. The computer-readable non-transitory storage media of claim 10, wherein generating the merged shader module further comprises linking each of the unlinked shader modules to form the merged shader module.

13. The computer-readable non-transitory storage media of claim 12, wherein the merged shader module is a linked shader module.

14. The computer-readable non-transitory storage media of claim 9, wherein analyzing the merged shader module further includes identifying a parameter of each of the shader modules that indicates the fragment-shader instructions of the respective shader module.

15. The computer-readable non-transitory storage media of claim 9, wherein analyzing the merged shader module further includes identifying instructions of each of the shader modules that are nested within fragment-shader instructions of the respective shader module.

16. The computer-readable non-transitory storage media of claim 9, wherein analyzing the merged shader module further includes identifying instructions of each of the shader modules that are dependent from fragment-shader instructions of the respective shader module.

17. A system comprising:

one or more processors; and a memory coupled to the processors comprising instructions executable by the processors, the processors being operable when executing the instructions to:

receive, through an editor for designing augmented-reality effects, a plurality of shader programs each for an augmented-reality object of a plurality of augmented-reality objects to be rendered for an augmented-reality effect;

compile each of the shader programs of augmented-reality object separately into corresponding shader modules;

generate a merged shader module based on the shader modules;

analyze, according to one or more criteria, the merged shader module to identify fragment-shader instructions and vertex-shader instructions;

split the merged shader module into a single fragment-shader module comprising the identified fragment-shader instructions and a single vertex-shader module comprising the identified vertex-shader instructions; and provide the single fragment-shader module and the single vertex-shader module to a graphics processing unit (GPU) to render the augmented-reality objects.

18. The system of claim 17, wherein compiling each of the shader programs further comprises compiling each of the shader programs separately into corresponding unlinked shader modules.

19. The system of claim 18, wherein each of the unlinked shader modules includes unlinked bytecode.

20. The system of claim 18, wherein generating the merged shader module further comprises linking each of the unlinked shader modules to form the merged shader module.

* * * * *